(12) United States Patent
Garabello et al.

(10) Patent No.: US 8,752,444 B2
(45) Date of Patent: *Jun. 17, 2014

(54) ELECTRO-HYDRAULIC CONTROL APPARATUS FOR A MOTOR-VEHICLE TRANSMISSION WITH AT LEAST FIVE FORWARD GEARS AND ONE REVERSE GEAR

(71) Applicant: C.R.F. Societa Consortile Per Azioni, Orbassano (IT)

(72) Inventors: Marco Garabello, Orbassano (IT); Giancarlo Osella, Orbassano (IT); Attilio Porta, Orbassano (IT); Gianluigi Pregnolato, Orbassano (IT); Sara Sottano, Orbassano (IT)

(73) Assignee: C.R.F. Societa Consortile Per Azioni, Orbassano (Turin) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,630

(22) Filed: Dec. 10, 2012

(65) Prior Publication Data

US 2013/0312561 A1 Nov. 28, 2013

Related U.S. Application Data

(62) Division of application No. 12/330,993, filed on Dec. 9, 2008, now Pat. No. 8,429,993.

(30) Foreign Application Priority Data

Dec. 18, 2007 (EP) ..................................... 07425799

(51) Int. Cl.
*F16H 59/00* (2006.01)
*B60W 10/02* (2006.01)

(52) U.S. Cl.
USPC ............................................ 74/335; 192/3.54

(58) Field of Classification Search
USPC ............ 74/330, 329, 331, 335; 477/123, 127; 192/3.54, 3.57, 3.58, 3.61, 87.18
See application file for complete search history.

(56) References Cited

U.S. PATENT DOCUMENTS

| | | | |
|---|---|---|---|
| 5,941,358 | A | 8/1999 | Hosseini et al. |
| 6,898,992 | B2 | 5/2005 | Koenig et al. |
| 7,073,407 | B2 | 7/2006 | Stefina |

(Continued)

FOREIGN PATENT DOCUMENTS

| | | |
|---|---|---|
| DE | 101 25 172 A1 | 11/2002 |
| DE | 10 2005 046 899 A1 | 5/2007 |

(Continued)

*Primary Examiner* — Roger Pang
(74) *Attorney, Agent, or Firm* — Sughrue Mion, PLLC (57) ABSTRACT

An electro-hydraulic control apparatus for a motor-vehicle transmission having at least five forward gears and one reverse gear, including first, second and third shift forks, each movable in at least one engagement position to engage a respective gear, first, second and third hydraulic actuators each arranged to control the movement of a respective shift fork in the respective at least one engagement position, and a slide valve selectively movable into one of at least three operating positions in each of which the slide valve selects a respective hydraulic actuator, wherein a first operating position is an end-of-travel position and corresponds to the selection of the first hydraulic actuator, and wherein a second operating position is also an end-of-travel position and corresponds to the selection of the second hydraulic actuator.

18 Claims, 6 Drawing Sheets

(56) References Cited

U.S. PATENT DOCUMENTS

| | | |
|---|---|---|
| 7,155,993 B2 | 1/2007 | Koenig et al. |
| 7,418,885 B2 | 9/2008 | Muller et al. |
| 7,464,618 B2 | 12/2008 | Mohlmann et al. |
| 7,823,473 B2 | 11/2010 | Uberti et al. |
| 8,429,993 B2 * | 4/2013 | Garabello et al. .............. 74/335 |
| 2006/0005647 A1 | 1/2006 | Braford et al. |
| 2007/0028708 A1 | 2/2007 | Futamura et al. |

FOREIGN PATENT DOCUMENTS

| | | |
|---|---|---|
| EP | 1 347 195 A1 | 9/2003 |
| EP | 1 531 292 A2 | 5/2005 |
| EP | 1 710 477 A1 | 10/2006 |
| EP | 1 965 101 A1 | 3/2007 |
| EP | 1 832 786 A1 | 9/2007 |
| EP | 1 930 626 A1 | 6/2008 |
| JP | 60-220246 | 11/1985 |

* cited by examiner

FIG. 1

PRIOR ART

ELECTRO-HYDRAULIC CONTROL APPARATUS FOR A MOTOR-VEHICLE TRANSMISSION WITH AT LEAST FIVE FORWARD GEARS AND ONE REVERSE GEAR

This is a divisional application of Ser. No. 12/330,993, filed Dec. 9, 2008, (Confirmation No. 1800), which claims priority to EP 07425799.9, filed Dec. 18, 2007, all of which are incorporated herein by reference.

BACKGROUND OF THE INVENTION

The present invention relates to an electro-hydraulic control apparatus for a motor-vehicle transmission, in particular for a transmission with six or seven forward gears and one reverse gear, either of the double-clutch type or of the single-clutch type derived therefrom.

European Patent Application EP1965101 in the name of the Applicant discloses an electro-hydraulic control apparatus for a motor-vehicle double-clutch transmission with six or seven forward gears and one reverse gear, which control apparatus comprises a gear shift control device and a hydraulic control circuit. The gear shift control device includes four shift forks operatively associated each to a respective engagement sleeve of the transmission to cause this latter to move between first and second engagement positions, and an actuating unit comprising four double-acting hydraulic actuators arranged to control each the movement of a respective shift fork. The hydraulic control circuit comprises a supply unit, a slide valve for selecting each time one of the four hydraulic actuators and two gear shift solenoid valves for controlling the hydraulic actuator selected each time by the slide valve to carry out the engagement of either one of the gears associated to this actuator. The slide valve has four operating positions, each of which corresponds to the selection of a respective hydraulic actuator, and is displaceable between these four operating positions by means of a special pilot solenoid valve. A position sensor is advantageously integrated into the slide valve to allow it to be position controlled.

German Patent Application DE10125172 discloses an electro-hydraulic control apparatus for a motor-vehicle transmission having plurality of gears. This known control apparatus comprises four shift forks each movable in at least one engagement position to engage a respective gear, four hydraulic actuators each arranged to control the movement of a respective shift fork in the respective at least one engagement position, and a slide valve selectively movable into one of four operating positions in each of which the slide valve selects a respective hydraulic actuator.

SUMMARY OF THE INVENTION

It is an object of the present invention to provide an electro-hydraulic control apparatus for a motor-vehicle transmission, in particular for a transmission with six or seven forward gears and one reverse gear, either of the double-clutch type or of the single-clutch type derived therefrom, which makes it possible to use the vehicle also in case of failure or malfunction of the pilot solenoid valve associated to the slide valve and/or in case of failure or malfunction of the position sensor integrated into the slide valve.

This and other objects are fully achieved according to the invention by virtue of an electro-hydraulic control apparatus comprising:

first, second and third shift forks, each movable in at least one engagement position to engage a respective gear, first, second and third hydraulic actuators each arranged to control the movement of a respective shift fork in the respective at least one engagement position, and a slide valve selectively movable into one of at least three operating positions in each of which the slide valve selects a respective hydraulic actuator, wherein a first operating position of the slide valve is an end-of-travel position and corresponds to the selection of the first hydraulic actuator, wherein a second operating position of the slide valve is also an end-of-travel position and corresponds to the selection of the second hydraulic actuator, and wherein first and second hydraulic actuators are associated at least to the first gear and at least to the reverse gear, respectively.

Further advantageous characteristics of the invention are specified in the dependent claims.

BRIEF DESCRIPTION OF THE DRAWINGS

The characteristics and the advantages of the invention will become clear from the following detailed description, given purely by way of non-limiting example with reference to the appended drawings, in which.

DETAILED DESCRIPTION OF THE PREFERRED EMBODIMENTS

Figure 1:
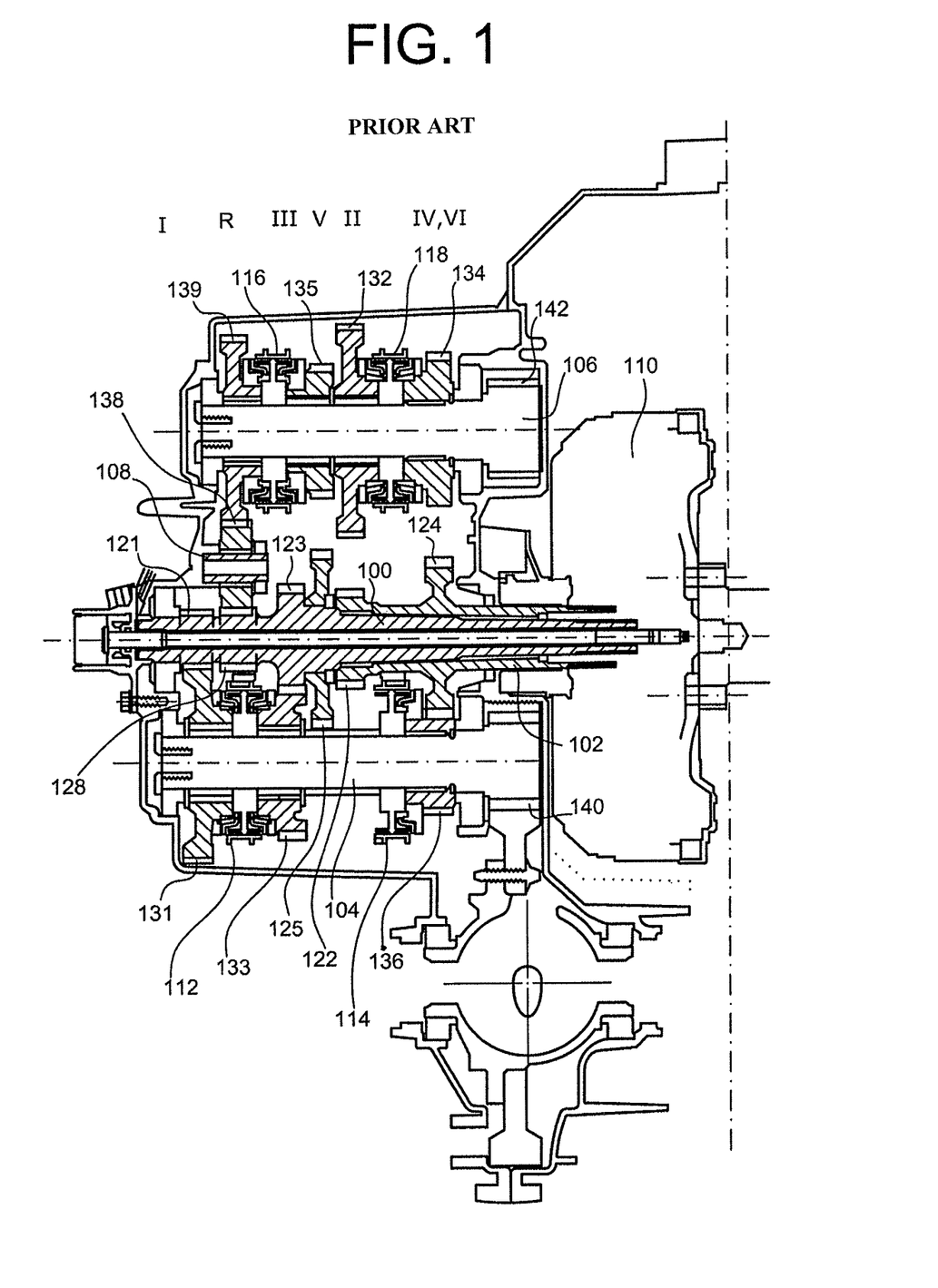
FIG. 1 is an axial section view of a motor-vehicle double-clutch transmission with six forward gears and one reverse gear according to the prior art.

An example of a motor-vehicle double-clutch transmission with six forward gears and one reverse gear to which an electro-hydraulic control apparatus according to the present invention can be applied is shown in FIG. 1 and corresponds to the transmission disclosed in European Patent Application EP1930626 in the name of the Applicant. With reference to FIG. 1, the transmission includes a pair of coaxial primary shafts 100 and 102, that is, an inner primary shaft and an outer primary shaft, respectively, a pair of secondary shafts 104 and 106, an intermediate shaft 108 for the reverse gear, and a clutch unit 110 comprising a pair of friction clutches for coupling each a respective primary shaft with the driving shaft of the motor vehicle (not shown) through a flywheel (also not shown).

The inner primary shaft 100 carries a plurality of driving gearwheels associated to the odd gears (first, third and fifth gear) and to the reverse gear, while the outer primary shaft 102 carries a plurality of driving gearwheels associated to the even gears (second, fourth and sixth gear). In order to make the understanding of the ways of operation of the transmission easier, Roman numerals I, II, III, IV, V, VI, VII and letter R have been located in FIG. 1, as well as in FIGS. 2 and 3 described herein below, at the same level as the planes of the gear trains associated to the first gear, to the second gear, to the third gear, to the fourth gear, to the fifth gear, to the sixth gear, to the seventh gear and to the reverse gear, respectively.

More specifically, the inner primary shaft 100 carries in the order (starting from the end opposite to the clutch unit 110, that is, from the left-hand end according to the point of view of a person observing FIG. 1), a driving gearwheel 121 associated to the first gear, a driving gearwheel 128 associated to the reverse gear, a driving gearwheel 123 associated to the third gear and a driving gearwheel 125 associated to the fifth gear, while the outer primary shaft 102 carries in the order from left to right a driving gearwheel 122 associated to the second gear and a driving gearwheel 124 associated both to the fourth gear and to the sixth gear. All the above-mentioned driving gearwheels are drivingly connected for rotation with the respective primary shaft.

The first secondary shaft 104 carries in the order (starting from the end opposite to the clutch unit 110, that is, from the left-hand end according to the point of view of the person observing FIG. 1), an idle gearwheel 131 permanently meshing with the driving gearwheel 121 of the inner primary shaft 100 to implement the first gear, an idle gearwheel 133 permanently meshing with the driving gearwheel 123 of the inner primary shaft 100 to implement the third gear, an idle gearwheel 136 permanently meshing with the driving gearwheel 124 of the outer primary shaft 102 to implement the sixth gear, and a final reduction pinion 140. The intermediate shaft 108 for the reverse gear carries an idle gearwheel 138 permanently meshing with the driving gearwheel 128 of the inner primary shaft 100. The second secondary shaft 106 carries in the order from left to right an idle gearwheel 139 permanently meshing with the idle gearwheel 138 of the intermediate shaft 108 to implement the reverse gear, an idle gearwheel 135 permanently meshing with the driving gearwheel 125 of the inner primary shaft 100 to implement the fifth gear, an idle gearwheel 132 permanently meshing with the driving gearwheel 122 of the outer primary shaft 102 to implement the second gear, an idle gearwheel 134 permanently meshing with the driving gearwheel 124 of the outer primary shaft 102 to implement the fourth gear, and a final reduction pinion 142.

The first secondary shaft 104 further carries a sliding engagement sleeve 112 selectively movable to the left or to the right to drivingly connect the idle gearwheel 131 or the idle gearwheel 133, respectively, for rotation with the shaft 104 in order to engage the first gear or the third gear, respectively, and a sliding engagement sleeve 114 movable to the right to drivingly connect the idle gearwheel 136 for rotation with the shaft 104 in order to engage the sixth gear. The second secondary shaft 106 further carries a sliding engagement sleeve 116 selectively movable to the left or to the right to drivingly connect the idle gearwheel 139 or the idle gearwheel 135, respectively, for rotation with the shaft 106 in order to engage the reverse gear or the fifth gear, respectively, and a sliding engagement sleeve 118 selectively movable to the left or to the right to drivingly connect the idle gearwheel 132 or the idle gearwheel 134, respectively, for rotation with the shaft 106 in order to engage the second gear or the fourth gear, respectively.

Figure 2:
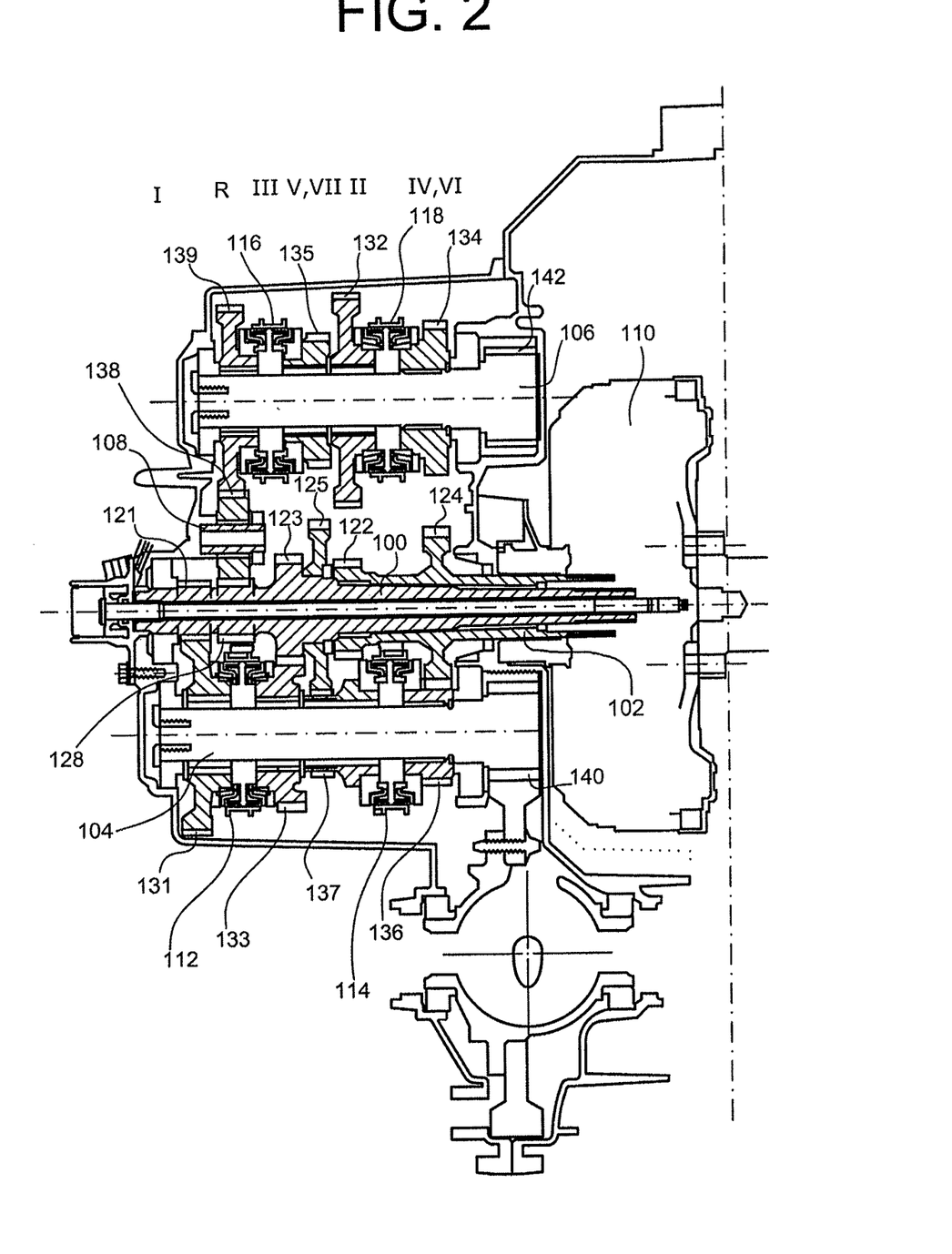
FIG. 2 is an axial section view of a motor-vehicle double-clutch transmission with seven forward gears and one reverse gear derived from the transmission of FIG. 1.

A motor-vehicle double-clutch transmission with seven forward gears and one reverse gear derived from the transmission of FIG. 1 is illustrated in FIG. 2, where parts and elements identical or corresponding to those of FIG. 1 have been given the same reference numerals. The transmission of FIG. 2 differs from the one of FIG. 1 substantially only in that the first secondary shaft 104 carries, between the idle gearwheels 133 and 136 of third gear and of sixth gear, an idle gearwheel 137 permanently meshing with the driving gearwheel 125 of the inner primary shaft 100 to implement the seventh gear. In this case, the sliding engagement sleeve 114 is selectively movable to the left or to the right to drivingly connect the idle gearwheel 137 or the idle gearwheel 136, respectively, for rotation with the secondary shaft 104 in order to engage the seventh gear or the sixth gear, respectively.

Figure 3:
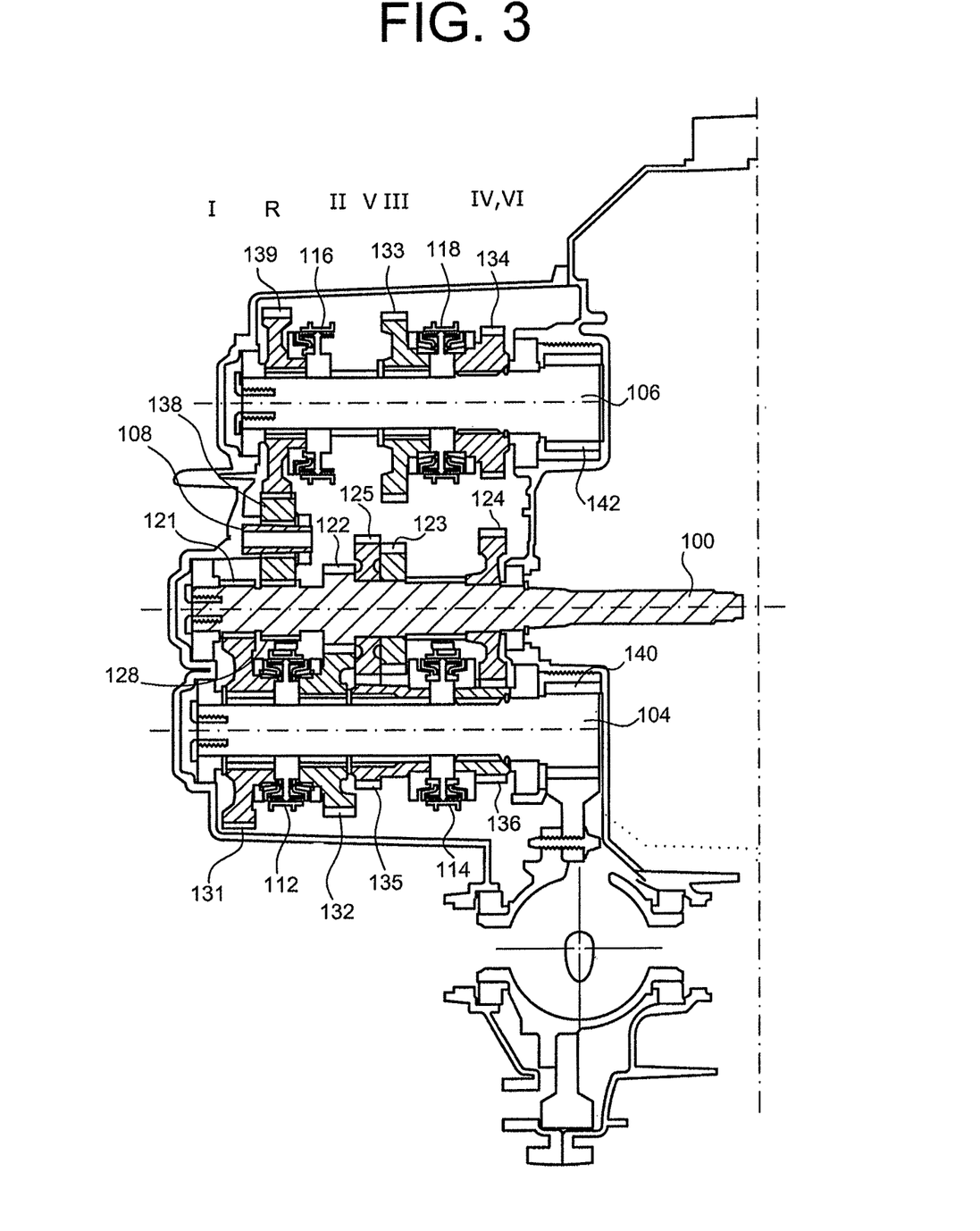
FIG. 3 is an axial section view of a motor-vehicle single-clutch transmission with six forward gears and one reverse gear derived from the transmission of FIG. 1.

A motor-vehicle single-clutch transmission with six forward gears and one reverse gear derived from the transmission of FIG. 1 is illustrated in FIG. 3, where parts and elements identical or corresponding to those of FIG. 1 have been given the same reference numerals.

With reference to FIG. 3, the transmission includes a single primary shaft 100, a pair of secondary shafts 104 and 106, an intermediate shaft 108 for the reverse gear, and a clutch unit 110 comprising a single friction clutch operable to couple the primary shaft 100 with the driving shaft of the motor vehicle (not shown) through a flywheel (also not shown).

The primary shaft 100 carries in the order (starting from the end opposite to the clutch unit 110, that is, from the left-hand end according to the point of view of a person observing FIG. 3) a driving gearwheel 121 associated to the first gear, a driving gearwheel 128 associated to the reverse gear, a driving gearwheel 122 associated to the second gear, a driving gearwheel 125 associated to the fifth gear, a driving gearwheel 123 associated to the third gear and a driving gearwheel 124 associated both to the fourth gear and to the sixth gear. All the above-mentioned driving gearwheels are drivingly connected for rotation with the primary shaft 100.

The first secondary shaft 104 carries in the order (starting from the end opposite to the clutch unit 110, that is, from the left-hand end according to the point of view of the person observing FIG. 3) an idle gearwheel 131 permanently meshing with the driving gearwheel 121 to implement the first gear, an idle gearwheel 132 permanently meshing with the driving gearwheel 122 to implement the second gear, an idle gearwheel 135 permanently meshing with the driving gearwheel 125 to implement the fifth gear, an idle gearwheel 136 permanently meshing with the driving gearwheel 124 to implement the sixth gear, and a final reduction pinion 140. The intermediate shaft 108 for the reverse gear carries an idle gearwheel 138 permanently meshing with the driving gearwheel 128. The second secondary shaft 106 carries in the order from left to right an idle gearwheel 139 permanently meshing with the idle gearwheel 138 of the intermediate shaft 108 to implement the reverse gear, an idle gearwheel 133 permanently meshing with the driving gearwheel 123 to implement the third gear, an idle gearwheel 134 permanently meshing with the driving gearwheel 124 to implement the fourth gear, and a final reduction pinion 142.

The first secondary shaft 104 further carries a sliding engagement sleeve 112 selectively movable to the left or to the right to connect the idle gearwheel 131 or the idle gearwheel 132, respectively, for rotation with the shaft 104 in order to engage the first gear or the second gear, respectively, and a sliding engagement sleeve 114 selectively movable to the left or to the right to connect the idle gearwheel 135 or the idle gearwheel 136, respectively, for rotation with the shaft 104 in order to engage the fifth gear or the sixth gear, respectively. The second secondary shaft 106 further carries a sliding engagement sleeve 116 movable to the left to connect the idle gearwheel 139 for rotation with the shaft 106 in order to engage the reverse gear, and a sliding engagement sleeve 118 selectively movable to the left or to the right to connect the idle gearwheel 133 or the idle gearwheel 134, respectively, for rotation with the shaft 106 in order to engage the third gear or the fourth gear, respectively.

Figure 4:
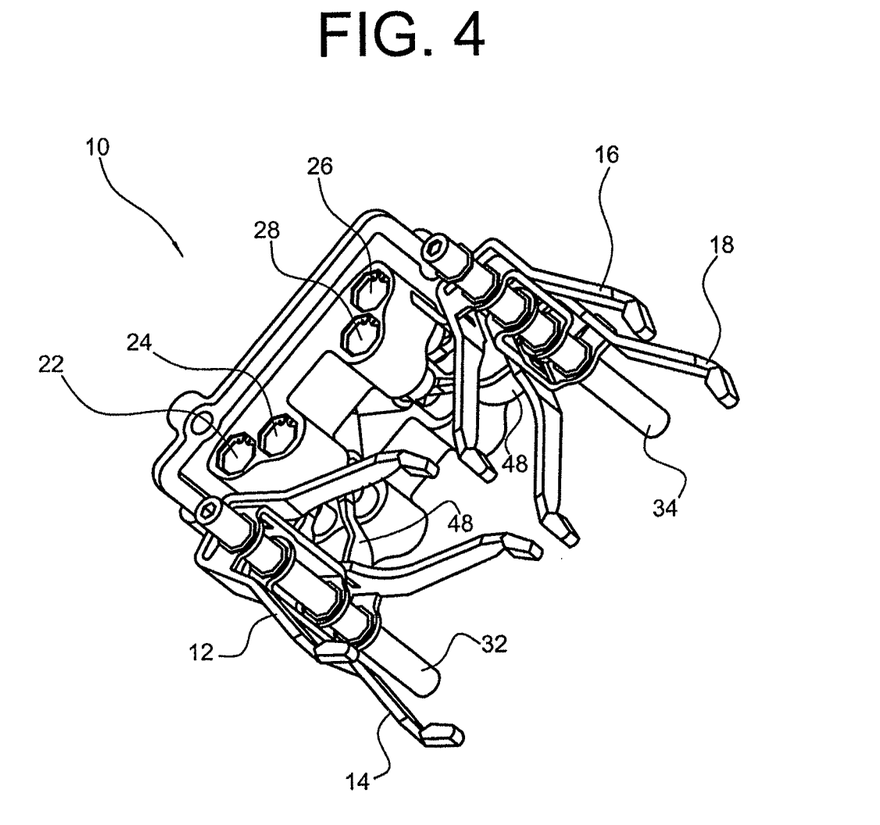
FIG. 4 is a perspective view of a gear shift control device forming part of an electro-hydraulic control apparatus for a motor-vehicle transmission according to the present invention.
Figure 6:
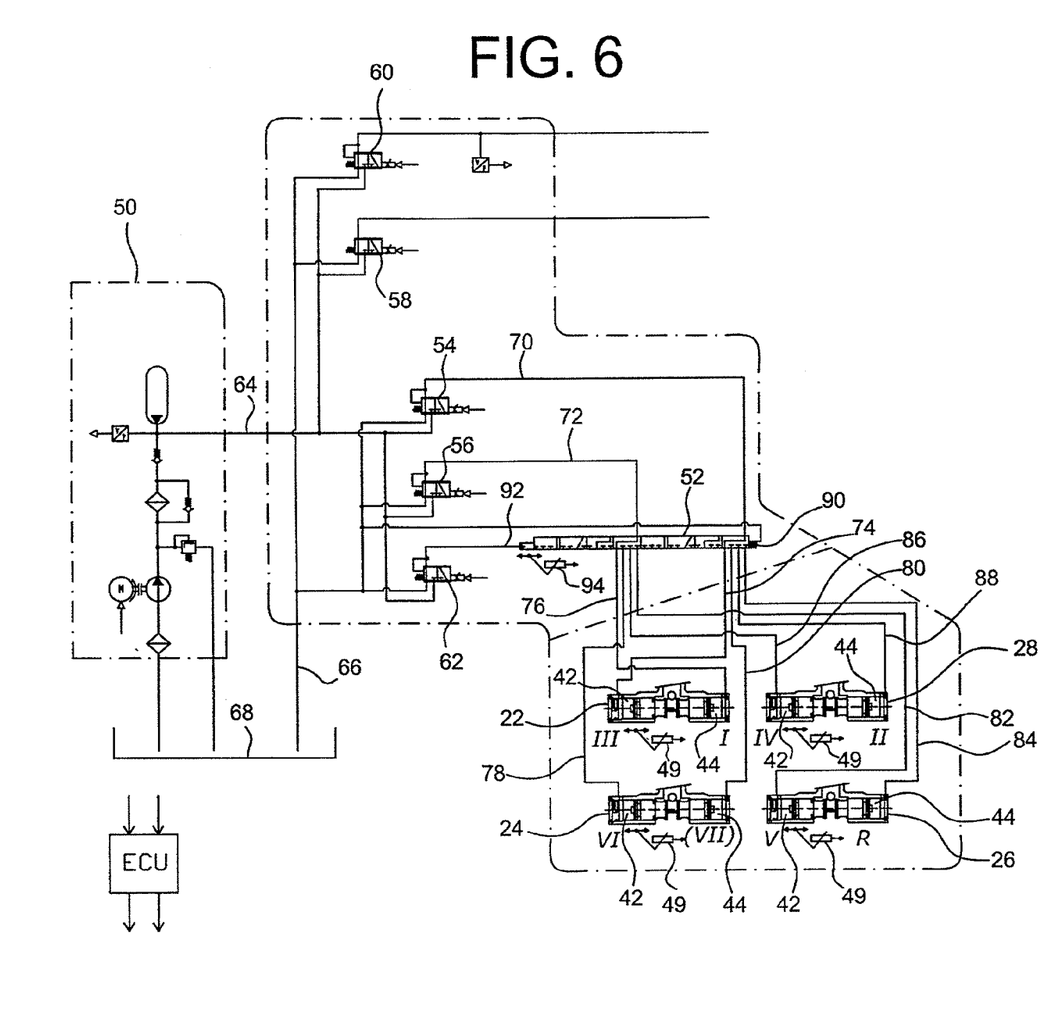
FIG. 6 is a scheme of a hydraulic circuit forming part of the electro-hydraulic control apparatus according to the present invention, when applied to a motor-vehicle double-clutch transmission with six or seven forward gears and one reverse gear.
Figure 7:
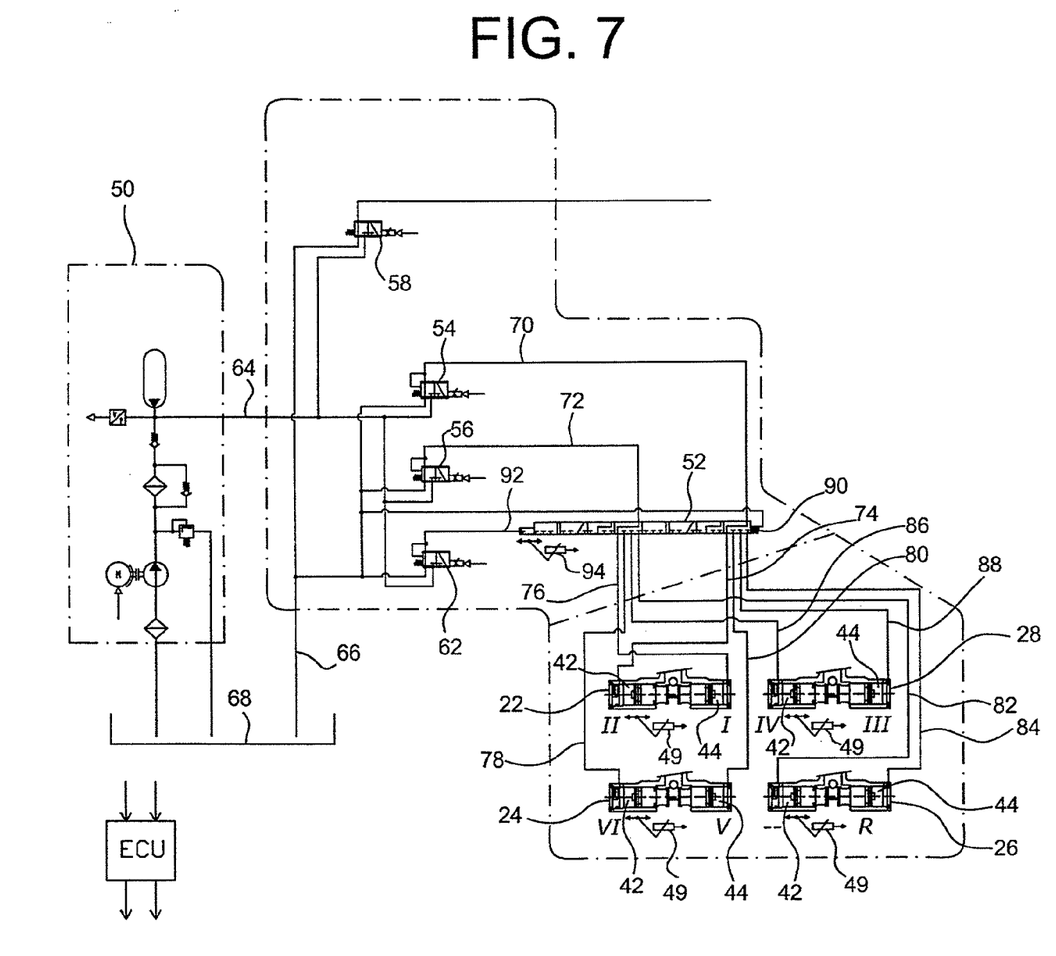
FIG. 7 is a scheme of a hydraulic circuit forming part of the electro-hydraulic control apparatus according to the present invention, when applied to a motor-vehicle single-clutch transmission with six forward gears and one reverse gear.

An electro-hydraulic control apparatus basically including a gear shift control device, illustrated in FIG. 4 and generally indicated therein with the reference numeral 10, and a hydraulic circuit, illustrated in FIG. 6 in its configuration intended for a double-clutch transmission and in FIG. 7 in its configuration intended for a single-clutch transmission, is provided to control the engagement of the gears.

With reference to FIG. 4, the gear shift control device 10 includes four shift forks 12, 14, 16 and 18, operatively associated each to a respective engagement sleeve 112, 114, 116 and 118 to control the movement of this latter between first and second engagement positions, in which it couples the respective one of the two idle gearwheels associated thereto for rotation with the respective secondary shaft 104 or 106 of the transmission. The gear shift control device 10 further includes an actuating unit comprising four double-acting hydraulic actuators, indicated with the reference numerals 22, 24, 26 and 28, respectively, each of which is arranged to control the movement of a respective shift fork 12, 14, 16 and 18, and hence of a respective engagement sleeve 112, 114, 116 and 118 between the aforesaid first and second engagement positions.

In the example of construction illustrated in FIG. 4, the shift forks 12, 14, 16 and 18 are mounted in pairs on two stationary rods 32 and 34 parallel to the secondary shafts 104 and 106 of the transmission. More in particular, the two shift forks 12 and 14 are slidably mounted on the rod 32, while the other two shift forks 16 and 18 are slidably mounted on the rod 34. Alternatively, the shift forks may be secured each to a respective sliding support rod.

The shift forks 12, 14, 16 and 18 illustrated in FIG. 4 are advantageously made according to the teachings of European Patent Applications EP1832786 or of non-published European Patent Application No. 07425666.0, both in the name of the Applicant, that is to say, with identical bodies suitably shaped to enable a partially overlapping arrangement of each pair of shift forks mounted on the same rod. It is however clear that the shift forks may have any other shape.

Figure 5:
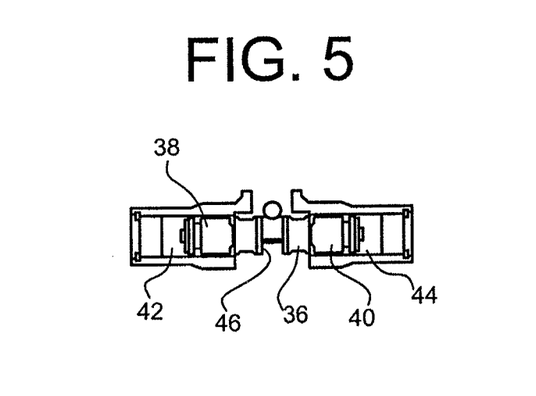
FIG. 5 is a simplified axial section view of a double-acting hydraulic actuator of the gear shift control device of FIG. 4.

As schematically illustrated in FIG. 5, each hydraulic actuator includes a plunger 36 forming at its opposite ends first and second head portions 38 and 40 which are slidably and fluid-tightly arranged in respective first and second chambers 42 and 44. In its intermediate area between the head portions 38 and 40, the plunger 36 has on its cylindrical lateral surface a notch 46 in which an actuating nose 48 (FIG. 4) of the shift fork 12, 14, 16 or 18 associated to the actuator engages, in such a manner that the translational movement of the plunger of each hydraulic actuator is transmitted to the associated shift fork and hence to the associated engagement sleeve. The notches 46 of the plungers 36 of the four hydraulic actuators 22, 24, 26 and 28 are preferably arranged in a single plane, in the intermediate neutral position between the two engagement positions.

Each hydraulic actuator 22, 24, 26 and 28 is also provided with a position sensor 49 (illustrated only by means of a symbol in FIGS. 6 and 7) for providing a an electronic control unit ECU of the transmission with a signal indicative of the position of the plunger 36 for position-feedback control of each actuator.

The hydraulic circuit of the electro-hydraulic control apparatus according to the invention, in the configuration intended for a double-clutch transmission with six or seven forward gears and one reverse gear, such as the one shown in FIG. 1 (six gears) or the one shown in FIG. 2 (seven gears), will be described now with reference to FIG. 6. As will be better explained herein below, the hydraulic circuit is arranged both to control the hydraulic actuators 22, 24, 26 and 28 of the gear shift control device 10 so as to shift each time from one gear to another on the base of the commands imparted by the electronic control unit ECU, and to control hydraulic actuating means, such as for example two additional hydraulic actuators (not shown), operable to control the friction clutches of the clutch unit 110 of the transmission.

The hydraulic control circuit basically comprises:
a supply unit 50,
a slide valve 52 (hereinafter referred to as selection slide valve) movable among four operating positions in each of which one of the four hydraulic actuators 22, 24, 26 or 28 is selected,
a first pair of three-way two-position proportional solenoid valves 54 and 56 (hereinafter referred to as gear shift solenoid valves) for controlling the hydraulic actuator each time selected by the selection slide valve 52 to engage either of the two gears associated to that actuator,
a second pair of three-way two-position proportional solenoid valves 58 and 60 (hereinafter referred to as clutch control solenoid valves) for controlling each a respective friction clutch of the clutch unit 110 of the transmission, and
an additional three-way two-position proportional solenoid valve 62 (hereinafter referred to as pilot solenoid valve) for controlling the movement of the selection slide valve 52 among the four operating positions thereof.

The expression "to select an actuator" used above is to be intended in the following description and claims as to put the two chambers 42 and 44 of the actuator in question in such a condition that they are connected to the supply unit 50 through the two gear shift solenoid valves 54 and 56.

In the example illustrated in FIG. 6, the two gear shift solenoid valves 54 and 56 are pressure proportional solenoid valves, the two clutch control solenoid valves 58 and 60 are a flow rate proportional solenoid valve and a pressure proportional solenoid valve, respectively, and the pilot solenoid valve 62 is a pressure proportional solenoid valve. It is however clear that each solenoid valve which is shown as a pressure proportional solenoid valve might alternatively be a flow rate proportional solenoid valve and on the other hand each solenoid valve which is shown as a flow rate proportional solenoid valve might alternatively be a pressure proportional solenoid valve.

The hydraulic control circuit further comprises a supply line 64 and a discharge line 66, through which the five solenoid valves 54, 56, 58, 60 and 62 are connected to the supply unit 50 and to a tank 68, respectively. The two gear shift solenoid valves 54 and 56 are connected each to a respective inlet of the selection slide valve 52 through a respective line 70 and 72. The chambers 42 and 44 of the first hydraulic actuator 22 (first gear and third gear) are connected to a first pair of outlets of the selection slide valve 52 through a pair of lines 74 and 76, respectively. The chambers 42 and 44 of the second hydraulic actuator 24 (sixth gear and possible seventh gear) are connected to a second pair of outlets of the selection slide valve 52 through a pair of lines 78 and 80, respectively. The chambers 42 and 44 of the third hydraulic actuator 26 (fifth gear and reverse gear) are connected to a third pair of outlets of the selection slide valve 52 through a pair of lines 82 and 84, respectively. The chambers 42 and 44 of the fourth hydraulic actuator 28 (second gear and fourth gear) are connected to a fourth pair of outlets of the selection slide valve 52 through a pair of lines 86 and 88, respectively.

In FIG. 6, the gear which can be engaged by the control apparatus when either of the two chambers 42 and 44 of the hydraulic actuators 22, 24, 26 and 28 is supplied with fluid is indicated with Roman numerals (as far as the forward gears are concerned) or with the letter R (as far as the reverse gear is concerned) near each chamber. For example, the engagement of the third gear is obtained by supplying working fluid to the chamber 42 of the first hydraulic actuator 22, whereas the engagement of the first gear is obtained by supplying working fluid to the chamber 44 of the first hydraulic actuator 22 and so on for the remaining hydraulic actuators 24, 26 and 28.

The selection slide valve 52 is held in a first operating position thereof (rest position) by a spring 90 and can be moved into the other three operating positions by the pilot solenoid valve 62 through a pilot line 92. The selection slide valve 52 is provided with a position sensor 94 (indicated only by means of a symbol), or alternatively with a pressure sensor, for position (or pressure) control of the slide valve itself. In each of the four operating positions of the selection slide valve 52, the two inlets of the slide valve connected to the two gear shift solenoid valves 54 and 56 through the lines 70 and 72 are put into communication each time with two outlets of the slide valve connected to a respective hydraulic actuator 22, 24, 26 or 28. In particular, the rest position of the selection slide valve 52, in which the slide valve is held by the spring 90 against a special mechanical stop, corresponds to the condition of selection of the hydraulic actuator 22, in which the lines 70 and 72 are put into communication with the lines 74 and 76, respectively, and hence the gear shift solenoid valves 54 and 56 are able to supply the chambers 42 and 44 of the hydraulic actuator 22 with fluid or to connect them to the tank in order to move the associated shift fork 12 into either of the engagement positions, corresponding to the engagement of the third gear or to the engagement of the first gear, respectively. The adjacent position of the selection slide valve 52 corresponds to the condition of selection of the hydraulic actuator 24, in which the lines 70 and 72 are put into communication with the lines 78 and 80, respectively, and hence the gear shift solenoid valves 54 and 56 are able to supply the chambers 42 and 44 of the hydraulic actuator 24 with fluid or to connect them to the tank in order to move the associated shift fork 14 into either of the engagement positions, corresponding to the engagement of the sixth gear or to the engagement of the seventh gear, respectively. The next position of the selection slide valve 52 corresponds to the condition of selection of the hydraulic actuator 28, in which the lines 70 and 72 are put into communication with the lines 86 and 88, respectively, and hence the gear shift solenoid valves 54 and 56 are able to supply the chambers 42 and 44 of the hydraulic actuator 28 with fluid or to connect them to the tank in order to move the associated shift fork 18 into either of the engagement positions, corresponding to the engagement of the fourth gear or to the engagement of the second gear, respectively. Finally, the position of the selection slide valve 52 opposite to the rest one, in which the slide valve abuts against a special mechanical stop, corresponds to the condition of selection of the hydraulic actuator 26, in which the lines 70 and 72 are put into communication with the lines 82 and 84, respectively, and hence the actuator control solenoid valves 54 and 56 are able to supply the chambers 42 and 44 of the hydraulic actuator 26 with fluid or to connect them to the tank in order to move the associated shift fork 16 into either of the engagement positions, corresponding to the engagement of the fifth gear or of the reverse gear, respectively.

The solenoid valves 54, 56, 58, 60 and 62 of the hydraulic circuit are feedback-controlled by the electronic control unit ECU, which receives as inputs the signals coming from the position sensors 49 of the hydraulic actuators 22, 24, 26 and 28, from the position (or pressure) sensor 94 of the selection slide valve 52 and from position (or pressure) sensors associated to the friction clutches of the clutch unit 110, and sends as outputs the control signals for the solenoid valves.

A variant of construction of the hydraulic circuit of FIG. 6, intended to be used in an electro-hydraulic control apparatus for a motor-vehicle single-clutch transmission with six forward gears and one reverse gear, such as the one shown in FIG. 3, is illustrated in FIG. 7, where parts and elements identical or corresponding to those of FIG. 6 have been given the same reference numerals.

The hydraulic circuit of FIG. 7 differs from the one of FIG. 6 mainly in that it comprises only one friction clutch solenoid valve 58, since the circuit is intended for a transmission having only one friction clutch. As in the hydraulic circuit of FIG. 6, all the solenoid valves 54, 56, 58 and 62 are proportional solenoid valves. Preferably, the gear shift solenoid valves 54 and 56 and the pilot solenoid valve 62 are pressure proportional solenoid valves, whereas the friction clutch solenoid valve 58 is a flow rate proportional solenoid valve.

Also the gears which can be engaged by the four hydraulic actuators 22, 24, 26 and 28 are different from those of the hydraulic circuit of FIG. 6. In this case, in fact, the hydraulic actuator 22 associated to the engagement sleeve 112 controls the engagement of the first gear and of the second gear, the hydraulic actuator 24 associated to the engagement sleeve 114 controls the engagement of the fifth gear and of the sixth gear, the hydraulic actuator 26 associated to the engagement sleeve 116 controls the engagement of the reverse gear, whereas the hydraulic actuator 28 associated to the engagement sleeve 118 controls the engagement of the third gear and of the fourth gear. Also in this case, however, the two opposite end-of-travel positions of the selection slide valve 52 correspond to the selection of the hydraulic actuator 22 (first gear and second gear) and of the hydraulic actuator 26 (reverse gear).

In the light of the above description the advantages offered by the electro-hydraulic control apparatus according to the present invention are clear.

First of all, the possibility of using the vehicle with a forward gear (first gear) o with the reverse gear is ensured also in case the selection slide valve 52 is controlled no more proportionally but rather in an ON/OFF way, as a result of a breakdown or malfunction of the position sensor 94 and/or of the pilot solenoid valve 62. The two stable operating positions of the selection slide valve 52, that is to say the rest position and the maximum-control position, in which the slide valve is at the end of its travel, correspond in fact to the selection of the hydraulic actuator 22 associated (at least) to the first gear and to the selection of the hydraulic actuator 26 associated (at least) to the reverse gear, respectively. In the control circuit for a double-clutch transmission according to FIG. 6, should the selection slide valve 52 be movable only between the two end-of-travel positions, the possibility of driving the vehicle also with gears, in particular the third gear and the fifth gear, higher than the first gear and the reverse gear, would be ensured anyway.

Secondly, since the hydraulic circuit is configured in such a manner that the engagement of the two starting gears (first and second gears) is controlled by different gear shift solenoid valves, namely by the solenoid valve 56 for the first gear and by the solenoid valve 54 for the second gear, the possibility of moving the vehicle also in case of failure of either of the gear shift solenoid valves is ensured.

Moreover, the use of only four hydraulic actuators on the one hand and of a selection slide valve along with two solenoid valves for control of the hydraulic actuators on the other hand makes it possible to minimize the number of components of the control apparatus.

Finally, the hydraulic actuators can be controlled independently from each other, which makes it possible, in a control apparatus intended for a double-clutch transmission, to carry out non-sequential gear shifts in power-shift mode.

Naturally, the principle of the invention remaining unchanged, the embodiments and constructional details may vary widely with respect to those described and illustrated purely by way of non-limiting example.

For example, the correspondence between the two opposite end-of-travel positions of the selection slide valve 52 and the two hydraulic actuators 22 and 26 might be inverted with respect to the proposed one. In other words, the rest position and the maximum-control position of the selection slide valve 52 might correspond to the selection of the hydraulic actuator 26 which controls the engagement of (at least) the reverse gear and to the selection of the hydraulic actuator 22 which controls the engagement of (at least) the first gear, respectively.

For example, the control apparatus according to the invention can also be applied to a double-clutch transmission with five forward gears and one reverse gear, as it suffices to this end to remove the shift fork 14 and the associated hydraulic actuator 24 and to adopt a selection slide valve 52 which can be switched onto three operating positions, instead of four.

What is claimed is:

1. Electro-hydraulic control apparatus for a motor-vehicle transmission having at least five forward gears and one reverse gear, the apparatus comprising:
    first, second and third shift forks, each movable in at least one engagement position to engage a respective gear,
    first, second and third hydraulic actuators each arranged to control the movement of a respective shift fork in the respective at least one engagement position, and
    a slide valve selectively movable into one of at least three operating positions in each of which the slide valve selects a respective hydraulic actuator, wherein a first operating position is an end-of-travel position and corresponds to the selection of the first hydraulic actuator, and wherein a second operating position is also an end-of-travel position and corresponds to the selection of the second hydraulic actuator,
    wherein the first hydraulic actuator is associated at least to the first gear and the second hydraulic actuator is associated at least to the reverse gear,
    wherein the first shift fork is movable between first and second engagement positions to engage the first gear and another odd gear, respectively, the second shift fork is movable between first and second engagement positions to engage the reverse gear and an odd gear, respectively, and the third shift fork is movable between first and second engagement positions to engage the second gear and another even gear, respectively,
    wherein the first, second and third hydraulic actuators are double-acting actuators,
    wherein the control apparatus further comprises first and second gear shift solenoid valves for controlling the supply of fluid to the hydraulic actuator each time selected by the slide valve or the connection of said hydraulic actuator with a tank,
    wherein the first and second gear shift solenoid valves are three-way two-position proportional solenoid valves.

2. Control apparatus according to claim 1, further comprising a pilot solenoid valve for controlling the movement of the slide valve among said at least three operating positions.

3. Control apparatus according to claim 2, wherein the pilot solenoid valve is a three-way two-position proportional solenoid valve.

4. Control apparatus according to claim 3, wherein the pilot solenoid valve is a pressure proportional solenoid valve.

5. Control apparatus according to claim 2, wherein the first operating positions of the slide valve is a rest position, in which the pilot solenoid valve does not generate any control hydraulic signal and the slide valve is held by resilient means against a first mechanical stop, and wherein the second operating position is a maximum-control position, in which the pilot solenoid valve generates a hydraulic control signal such that the slide valve is brought against a second mechanical stop opposite to the first one.

6. Control apparatus according to claim 2, wherein the second operating position of the slide valve is a rest position, in which the pilot solenoid valve does not generate any hydraulic control signal and the slide valve is held by resilient means against a first mechanical stop, and wherein the first operating position is a maximum-control position, in which the pilot solenoid valve generates a hydraulic control signal such that the slide valve is brought against a second mechanical stop opposite to the first one.

7. Control apparatus according to claim 1, wherein the control apparatus is configured in such a manner that the first gear can be engaged by the first shift fork by means of the first hydraulic actuator upon energization of the first gear shift solenoid valve and that the second gear can be engaged by the third shift fork by means of the third hydraulic actuator upon energization of the second gear shift solenoid valve.

8. Control apparatus according to claim 1, wherein the first, second and third shift forks are arranged to engage, in the second engagement position, the third gear, the fifth gear and the fourth gear, respectively.

9. Control apparatus according to claim 1, further comprising a fourth shift fork movable between first and second engagement positions to engage the sixth gear or the seventh gear, respectively, and a fourth double-acting hydraulic actuator arranged to control the movement of the fourth shift fork between said first and second engagement positions.

10. Control apparatus according to claim 7, wherein the first and second gear shift solenoid valves are pressure proportional solenoid valves.

11. Control apparatus according to claim 1,
    wherein each double-acting hydraulic actuator includes first and second chambers and a plunger forming at its opposite ends first and second head portions slidably and fluid-tightly arranged in the first and second chambers, respectively, and
    wherein the first and second gear shift solenoid valves are arranged to be connected each to a respective chamber of the hydraulic actuator each time selected by the slide valve.

12. Control apparatus according to claim 1, further comprising first position sensors associated each to a respective hydraulic actuator to generate a first measure signal indicative of the position of the actuator, and a second position sensor associated to the slide valve to generate a second measure signal indicative of the position of the slide valve.

13. Control apparatus according to claim 12, further comprising an electronic control unit (ECU) arranged to receive at least said first measure signals and said second measure signal and to position feedback control the solenoid valves and the slide valve on the base at least of said first measure signals and of said second measure signal.

14. Control apparatus according to claim 1, further comprising at least one clutch control solenoid valve for controlling a first friction clutch of the transmission.

15. Control apparatus according to claim 14, wherein said first clutch control solenoid valve is a three-way two-position flow rate proportional solenoid valve.

16. Control apparatus according to claim 14, further comprising a second clutch control solenoid valve for controlling a second friction clutch of the transmission.

17. Control apparatus according to claim 16, wherein said second clutch control solenoid valve is a three-way two-position pressure proportional solenoid valve.

18. Motor-vehicle double-clutch transmission with at least five forward gears and one reverse gear, including an electro-hydraulic control apparatus according to claim 1.

* * * * *